United States Patent [19]

Tsuruoka et al.

[11] Patent Number: 5,020,214

[45] Date of Patent: Jun. 4, 1991

[54] METHOD OF MANUFACTURING A HOT WIRE AIR FLOW METER

[75] Inventors: Shigeo Tsuruoka; Ken Takahashi; Tadahiko Miyoshi; Hiroatsu Tokuda, all of Ibaraki, Japan

[73] Assignee: Hitachi, Ltd., Tokyo, Japan

[21] Appl. No.: 250,212

[22] Filed: Sep. 28, 1988

[30] Foreign Application Priority Data

Sep. 30, 1987 [JP] Japan .................. 62-243791
Jan. 26, 1988 [JP] Japan .................. 63-15421
Jun. 23, 1988 [JP] Japan .................. 63-155196

[51] Int. Cl.⁵ .............. H05B 3/00; H01C 17/02; H01C 17/28
[52] U.S. Cl. ............... 29/611; 29/613; 29/619; 338/269; 338/275
[58] Field of Search ............... 29/610.1, 611, 613, 29/619; 73/118.2, 204.27, 202.5; 338/269, 268, 263, 262, 252, 275

[56] References Cited

U.S. PATENT DOCUMENTS

| 786,257 | 4/1905 | Beebe .................. 29/611 |
| 971,101 | 9/1910 | VanAller . |
| 2,269,850 | 1/1942 | Hebler . |
| 2,287,460 | 6/1942 | Wagenhals et al. . |
| 2,319,516 | 5/1943 | Phelps . |
| 2,624,199 | 1/1953 | Boyer . |
| 3,246,515 | 4/1966 | Martino et al. . |
| 4,369,656 | 1/1983 | Ueno et al. . |
| 4,400,974 | 8/1983 | Nishimura et al. . |
| 4,790,182 | 12/1988 | Takahashi et al. .......... 338/263 |

FOREIGN PATENT DOCUMENTS

| 62-83622 | 4/1987 | Japan . |
| 62-88921 | 4/1987 | Japan . |
| 62-179610 | 8/1987 | Japan . |
| 63-94119 | 4/1988 | Japan . |
| 63-94120 | 4/1988 | Japan . |

Primary Examiner—P. W. Echols
Attorney, Agent, or Firm—Antonelli, Terry, Stout & Kraus

[57] ABSTRACT

An exothermic resistor for use in a hot wire air flow meter, having a wire (2) in the form of a coil made of a metal, a pair of lead wires (3) connected to connections (21) formed at the opposite ends of the coil, and a support member (4) which integrally supports the connection as well as the coil located between the connections. An example of the support member is in the form of a tubular cylinder closed at its both ends. The support member is formed from glass only or formed of a layer of a glass-ceramic-composite material. The hot wire air flow meter is designed to be easely mass-produced and to have improved transient response characteristics with respect to abrupt changes in the air flow rate.

19 Claims, 11 Drawing Sheets

METHOD OF MANUFACTURING A HOT WIRE AIR FLOW METER

BACKGROUND OF THE INVENTION

1. Field of the Invention

This invention relates to a hot wire air flow meter. More particularly, this invention relates to a hot wire air flow meter suitable for measurement of the flow rate of air taken into an internal combustion engine for a motor vehicle, and also relates to a method of manufacturing such a hot wire air flow meter.

2. Description of the Prior Art

A hot wire air flow meter has a heating coil which is formed as an exothermic resistor that is disposed in an air flow path the flow rate of which is to be measured. In order to eliminate any reduction in the temperature of the heating coil due to the cooling effect of the air flow, a current which flows through the air flow path is increased so as to heat up the coil. The air flow rate is determined from this increase in the current. This type of air flow meter can be constituted without employing any movable parts and, at the same time, it enables direct detection of the mass flow. For this reason, air flow meters of this type are generally adopted to perform air-fuel ratio control in the internal combustion engines of motor vehicles.

The exothermic resistor provided in this type of air flow meter comprises a very thin metal wire, e.g., a platinum wire having a diameter of several tens microns. For instance, an exothermic resistor such as the one disclosed in Japanese Utility Model Laid-Open No. 56-96326/1981 is formed in such a manner that a metal wire provided as an exothermic resistance wire is wound around a core wire, that is, a bobbin made of a ceramic material.

Another type of exothermic resistor is disclosed in an already filed patent application (now U.S. Pat. No. 4,790,182) which is a bobbinless exothermic resistor in the form of a coil formed from a metal wire and over-coated with glass except for opposite end portions which are welded to a support for the exothermic resistor.

In the case of an exothermic resistor formed of a metal wire wound around a core wire or bobbin made of a ceramic material employing one of the above conventional techniques, the quantity of heat heating up the body of the bobbin and the quantity of heat transmitted through the bobbin to the support on which the exothermic resistor rests are not negligible. There is therefore a problem of retardation of the transient response to any fluctuation in the air flow, in particular, resulting in the occurrence of surging when the vehicle is sharply accelerated or decelerated. In addition, it is necessary during the process of manufacturing exothermic resistors to perform a coil winding operation for each exothermic resistor, which makes automatization of the process difficult.

In contrast, the bobbinless type of exothermic resistor has improved response characteristics and can be manufactured with an improved degree of automatization because the coil winding operation can be continuously performed for a plurality of resistors of this type. However, it is difficult to handle the opposite end portions of the wire which are not coated with glass, and there is a problem regarding a reduction in the ease with which the operation of securing the resistor to the support can be performed in the manufacturing process. In addition, the layer of coating glass which acts as a support member for supporting the coiled portion of the wire must have a substantial thickness so as to ensure the specified strength of the final products. In consequence, heat transfer between the wire and the air flow is obstructed due to the glass layer having inferior heat conductivity, thereby causing deterioration in the transient response characteristics.

In the structure of the bobbinless type of exothermic resistor, the inner surface of the cylindrical member which is formed by means of glass coating (in which the wire extends helically) is brought into contact with the outside air. If any dust and/or ionic substances are contained in the air the flow rate of which is to be measured, the dust and/or ionic substances become attached to the inner surface of the cylindrical member, or, in the worst case, the inner space of the cylindrical member becomes filled with accumulated dust. In this worst case, the heat generating from the wire is transmitted through the medium of the dust, thereby impairing the advantage of the bobbinless type. If the inner space of the resistor is filled with attached and accumulated ionic substances, short circuiting takes place between adjacent coiled portions of the wire, and characteristics specific to the exothermic resistor are thereby changed. In a method of manufacturing the conventional bobbinless exothermic resistor, a step of removing a bobbin after a coil has been formed by winding a metal wire around this bobbin is adopted, and chemical etching is utilized as a means for removing the bobbin, thereby necessitating an additional process for performing this etching. This makes the overall manufacturing process more complicated.

SUMMARY OF THE INVENTION

It is an object of the present invention to provide a hot wire air flow meter having an exothermic resistor and a method of manufacturing the same, the hot wire flow meter being capable of being manufactured with an increased degree of automatization as well as being easily handled and having suitable response characteristics.

It is another object of the present invention to provide a hot wire air flow meter having an exothermic resistor, the exothermic resistor being capable of maintaining suitable response characteristics in the face of the influence of dust or ionic substances contained in the air as well as being protected against any deterioration in its overall characteristics.

It is still another object of the present invention to provide a method of manufacturing a hot wire air flow meter in which a complicated step previously forming part of the manufacturing process is eliminated.

To these ends, the present invention provides a hot wire air flow meter having an exothermic resistor having a metal wire or an exothermic resistance wire wound in a coil, metal lead wires connected to opposite ends of this coil, and a support member made of, for example, a glass, the support member supporting (integrally fixing) connections between the wound wire and the lead wires as well as the wound wire located between these connections.

This type of hot wire air flow meter is manufactured by a method including: preparing a blank constituted by a metal core wire having a desired length, a metal wire wound around the core wire and used as an exothermic resistance wire, and a pair of lead wires welded to opposite ends of the wound wire; overcoating the wound wire with a glass material such that this glass material also covers welded portions; sintering the overcoating; and thereafter removing the core wire. If a glass core is used in place of the core wire, there is no need for the step of removing the core.

In accordance with the present invention, a metal wire is continuously wound around a metal core wire or a glass core line to form a lengthwise blank having a length corresponding to a plurality of exothermic resistors successively disposed in line. At this time, the metal wire is continuously wound at a time by an automatic winding machine for the plurality of exothermic resistors, thereby remarkably increasing the degree of automatization of the manufacturing process.

Thereafter, the thus-prepared blank constituted by the core wire and the resistance wire is cut into pieces, each having a desired length, and lead wires are welded to opposite ends of each piece. Welded portions, as well as the resistance wire located between the welded portions, are overcoated with a glass so that they are fixed integrally. In consequence, the exothermic resistance wire is supported (integrally fixed) by the lead wires and the glass member, and this exothermic resistor is easy to handle since there is no need for an operation of connecting thin wires to the support for the exothermic resistor.

The metal core wire short-circuits the coil between the lead wires since it has electro-conductive properties. It is therefore removed by means of, for example, etching using an acid. It is possible to improve the exothermic portion in terms of mechanical strength and corrosion resistance by the overcoating glass. It is thereby ensured that the heat caused by energization of the resistance wire can be almost entirely transmitted to the air without heating the bobbin or core having a large heat capacity or being transmitted to the support via the bobbin as in the case of the conventional bobbin-type exothermic resistor. It is therefore possible for the hot wire air flow meter to be improved in the response characteristics with respect to abrupt changes in the air flow rate and to output signals by suitably following up actual changes in the air flow rate, thereby optimizing the fuel supply control and solving the problem of surging, etc.

If the glass core line is used, there is no need for the step of removing the core since the glass core is nonelectro-conductive. In this case, it is possible to reduce the thickness of the glass overcoating so as to avoid any considerable increase in the total heat capacity because the mechanical strength of the exothermic resistor can be maintained by the core. As a result, the response characteristics do not become inferior compared with the case where the metal core wire is removed.

A method of filling the cavity formed by removing the metal core wire with a glass is also possible. The resulting resistor has the same characteristics as the resistor having the glass core.

The resistance wire is ordinarily formed of a platinum wire superior in terms of thermal resistance and corrosion resistance. Instead, it can be formed of a tungsten wire. The lead wires may be wires made of a platinum-iridium.

If the glass is baked at an excessively high temperature, the platinum wire becomes embrittled and the electrical characteristics thereof become changed. Heating at a temperature higher than about 1200° C. for a long time must be avoided. Correspondingly, to perform baking at a temperature lower than 1200° C., a glass material having a viscosity of $10^4$ to $10^7$ poise at temperatures of 800 to 850° C. is used as the glass material for supporting the exothermic resistor. It is not always necessary that the thermal expansion coefficient of the glass is equal to that of the platinum wire ($90 \times 10^{-7}/°$ C.). However, this is preferred in terms of reduction in the stress due to the heat cycle during operation. If the core wire is removed by etching using an acid, it is necessary to prevent the glass from becoming greatly eroded. The acid resistance of the glass, as well as the viscosity properties, strongly relates to the connective strength of the structure of the glass. It was confirmed that, in the case of a glass having this viscosity-strength, erosion was limited to a depth of not greater than 1 μm. This glass is also suitable in terms of water resistance and oil resistance in an applied state. A glass the viscosity of which becomes reduced at a lower temperature can be baked at a lower temperature but the acid, water and oil resistances of this glass are insufficient.

A glass having the above-described suitable properties can be selected from lead-potash glass, lead-soda glass, lead-potash-soda glass, soda-lime glass, soda-barium glass, potash-lime glass, potash-barium glass and borosilicate glass.

A molybdenum wire or nickel-iron alloy wire is used as the metal core wire. With respect to these materials, heating at a temperature higher than 1200° C. in the atmosphere is not preferable. They can be used in combination with a glass having the above-described properties. Specifically, the thermal expansion coefficient of the nickel-iron alloy wire can be adjusted to that of the platinum wire, enabling a reduction in the thermal stress at the time of baking of the glass.

To attain the above objects, the present invention provides a hot wire air flow meter comprising an exothermic resistor including a glass member in the form of a cylindrical tube provided as a support member, and a metal wire in the form of a coil extending helically along the inner surface of the glass member and coaxially therewith and having its both ends electrically led to the outside of the glass member, wherein the glass member is closed at its both ends.

This exothermic resistor is manufactured by a method including steps of: winding a metal wire as an exothermic resistance wire around a sublimatable core wire; covering the wound wire and the core wire with a porous glass material; and performing heat treatment to sublimate the core wire and bake the glass.

The above cylindrical glass member having the inner surface along which the coil is formed is closed at its both ends, thereby preventing dust or ionic substances in the air from attaching the inner surface of the glass member or filling the cavity thereof. There is no possibility of any extraneous substance reaching the surface along which the coil is formed. The properties of the resistor are stabilized in terms of thermal or electrical effects, thereby attaining the above object.

In the manufacturing process, a sublimatable material is used for the core wire, and the core wire is sublimated at the time of baking of the glass by the heat required for this baking. It is therefore possible to eliminate the need for the etching step with respect to the removal of the core wire, thereby simplifying the process.

To attain the above objects, the present invention also provides an air flow meter comprising an exothermic resistor having an exothermic resistance wire or metal wire, a pair of lead wires connected to the wire, and a support member covering and supporting the exothermic resistance wire, wherein the support member is formed of a layer of a composite material composed of ceramic and glass materials.

The performance of this type of exothermic resistor can be effectively improved if this resistor has a cavity and if the glass component of the composite material forming the support member forms a surface layer thereof and also forms a continuous phase which reaches the cavity.

A ceramic material having a thermal conductivity of at least 10 W/m.K may be selected as the ceramic component of the composite material layer, which is also effective. It is preferable to set the proportion of the glass component of the composite material layer to 2 to 60 volume percent. The glass component of the composite material layer may include a glass having a softening temperature not higher than 700° C. and another glass having a softening temperature higher than 700° C., which is effective.

The exothermic resistor may have another type of structure in which the exothermic resistance wire is formed of a film circuit formed on a ceramic substrate while the support member is formed of the ceramic substrate and a layer of a composite material composed of ceramics and glass.

To attain the above objects, the present invention also provides a method of manufacturing an air flow meter, including steps of: preparing a blank constituted by a metal core wire having a desired length, a metal wire wound around the core wire and used as an exothermic resistance wire, and a pair of lead wires connected to opposite ends of the wound wire; depositing ceramic particles to the wound wire over the entire surface thereof and thereafter sintering the ceramic particles; removing the core wire; and forming a layer of composite material by coating the layer of sintered ceramic material with molten glass so that the glass permeates into the layer of sintered ceramic material. With respect to the step of preparing a blank constituted by a metal core wire, a metal wire wound around the core wire, and lead wires, it is possible to adopt a method of continuously winding a metal wire used as an exothermic resistance wire around a long metal core wire, cutting a blank thereby formed into pieces each having the desired length, and thereafter connecting the lead wires to the opposite ends of the wound metal wire, or a method of connecting the lead wires to opposite ends of the metal core wire (having the desired length), connecting one end of the metal wire used as an exothermic resistor to one of the lead wires, winding this resistance wire around the core wire, and thereafter connecting the other end to the other lead wire.

The layer of composite material composed of ceramics and glass may be formed by coating a mixed ceramic and glass particles to the wound metal wire over the entire area thereof and thereafter sintering this material. A glass coating may be formed over the composite material layer in a molten glass coating manner. Instead of this method of mixing ceramic and glass particles, it is possible to adopt a method of forming particles from a composite material composed of ceramics and glass, coating the metal wire wound around the metal core wire with these particles, and thereafter sintering this material.

The present invention also provides an air flow meter of a motor vehicle having the above-described exothermic resistor and a driving circuit which controls the current flowing through the exothermic resistor and takes out the voltage output from the exothermic resistor as a signal corresponding to the air flow rate. It also provides an anemometer having the above-described exothermic resistor and a means for detecting the temperature of the exothermic resistor.

In accordance with the present invention, the opposite ends of the resistance wire are connected to the lead wires, and therefore there is no need for an operation of connecting thin metal wires to the support, thereby making the resulting resistor easy to handle. In particular, the resistance wire, as well as the connections between the wire and the lead wires, is ordinarily covered with the support member so that the resistance wire and the lead wires are fixed. In consequence, the exothermic resistance wire is supported by the lead wires and the support member, thus realizing a structure suitable for handling of the resistor.

The core wire short-circuits the coil between the lead wires since it has electro-conductive properties. It is therefore removed by, for example, etching using an acid, or oxidation and sublimation at an increased temperature in the atmospheric air. The exothermic portion can be improved in the mechanical strength and the resistance to environmental influences by virtue of the composite material coating. The heat generated by the electrical current through the resistance wire is transmitted to the air via the composite material layer. It is possible to set the thermal conductivity of this composite material layer to at least about ten times as high as that of a glass, which is about 1 W/m.K, if this composite material layer is composed of this glass and a ceramic material having a thermal conductivity of at least 10 W/m.K. It is therefore possible to avoid a considerable retardation of the change in the heat transfer rate in response to a change in the air flow rate, thereby improving the transient response characteristics.

If the coating layer formed on the resistance wire is baked at an excessively high temperature, the platinum wire becomes embrittled and the electrical characteristics thereof become changed. Heating at a temperature higher than about 1200° C. for a long time must be avoided. For this reason, if the wire is coated with only a ceramic material having a high thermal conductivity, baking is not suitably performed and the strength of the exothermic resistor becomes inadequate. If the composite material layer is formed by coating the baked ceramic layer with a molten glass so that the glass permeates into this layer, it has an adequate strength as well as a high degree of thermal conductivity. If ceramic and glass materials are simultaneously coated to the resistance wire and are thereafter sintered, a composite material coating layer having an improved strength can be obtained by the sintering effect of the glass even if the composite material is sintered at a temperature not higher than 1200° C. In the case where there are pores remaining in the composite material layer, the layer is further coated with a molten glass to obtain a higher strength.

The uniformity of the components of the composite material layer can be improved if particles formed from a composite material composed of ceramic and glass materials are attached as a coating to the resistance wire and are thereafter baked. It is thereby possible to improve the accuracy with which the compounding ratio control is performed.

In terms of ease of coating, it is preferable to use, as the coating glass, a glass having a softening temperature lower than 700° C.

If the glass component of the composite material layer forms a continuous phase, the strength of the support member is increased. If the proportion of the glass component is excessively small, the strength of the support member becomes inadequate and, if the proportion of the glass component is excessively large, the effect of the composition making use of the ceramic material in order to increase the thermal conductivity is reduced. A suitable range of the proportion of the glass component of the composite material layer is 2 to 60 volume percent.

A molybdenum wire of a nickel-iron alloy used as the metal core wire can be removed by etching using an acid. The molybdenum wire can be removed during sintering of the coating layer since it sublimates by oxidizing in the air.

A type of air flow sensor element, that is, an exothermic resistor having an exothermic circuit constituted by a film pattern formed on an alumina substrate, and a support member which covers this film circuit and the alumina substrate has a reduced thickness.

DESCRIPTION OF THE PREFERRED EMBODIMENTS

Embodiment 1

Figure 1:
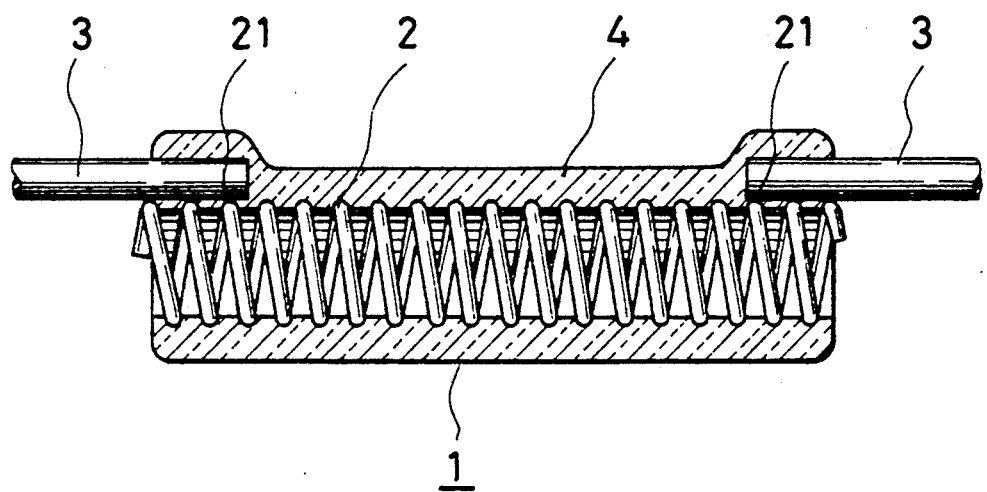
FIG. 1 is a longitudinal cross-sectional view of an exothermic resistor for use in a hot wire air flow meter of the present invention.

FIG. 1 shows the structure of an exothermic resistor 1 for use in a first embodiment of the present invention. The exothermic resistor 1 for detecting the intake air flow rate has a length of platinum wire 2 in the form of a coil, a pair of lead wires 3 made of a platinum-iridium alloy connected to opposite ends of the platinum wire coil 2, and a glass member 4 which supports the platinum wire 2 and connections 21 between the lead wires 3 and the platinum wire 2.

A method of manufacturing the exothermic resistor 1 will be described below with reference to FIGS. 2A to 2E.

Figure 2A:
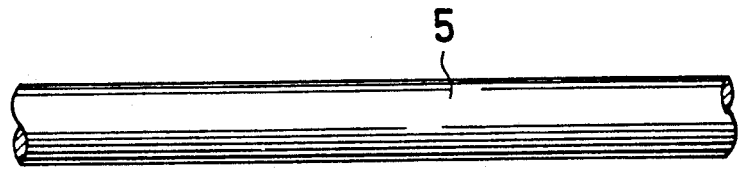
FIGS. 2A to 2E are diagrams of the process of manufacturing the exothermic resistor shown in FIG. 1.
Figure 2B:
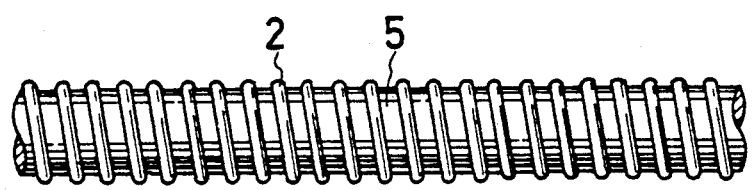
Figure 2C:
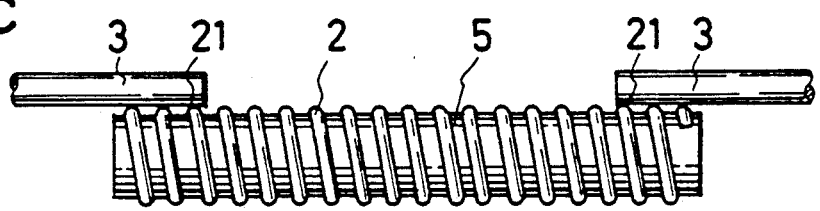
Figure 2D:
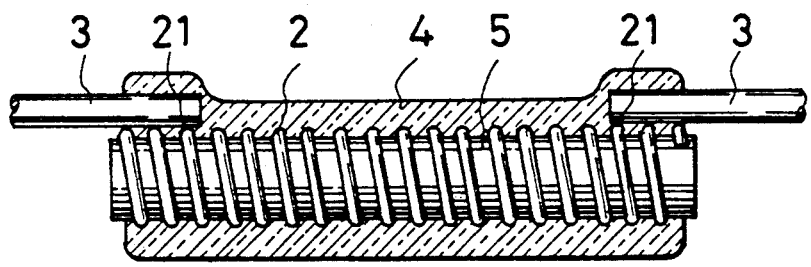
Figure 2E:
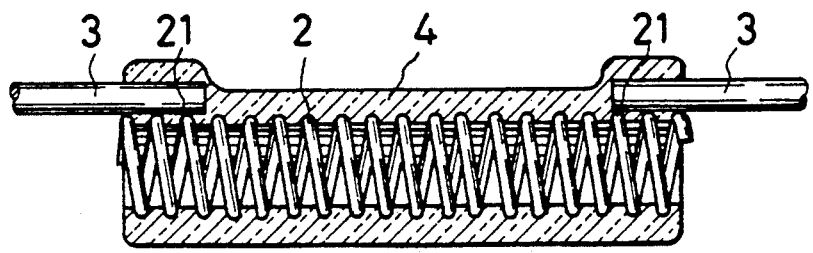

FIG. 2A shows a core wire or a bobbin 5 which has a diameter of 0.5 mm and is made of a Ni-Fe alloy having a Ni content of 52% and around which the platinum wire 2 is to be wound. As shown in FIG. 2B, a length of platinum wire 2 having a diameter of 20 μm was continuously wound around the core wire 5 over a length corresponding to two or more exothermic resistors by employing an automatic coil winding machine. As shown in FIG. 2C, a resistor blank thereby formed was cut into pieces, each having a length of 6 mm, and a pair of lead wires 3 made of a platinum-iridium alloy and having a diameter of 0.13 mm were welded to opposite ends of each piece at connections 21. Then, as shown in FIG. 2D, the connections 21 and the platinum wire 2 were overcoated with a glass material 4 in order to form a support member, and thereafter underwent sintering. The glass material 4 was a lead-potash-soda glass having a composition consisting of, by weight, 56% of $SiO_2$, 30% of PbO, 6% of $K_2O$, 6% of $Na_2O$, 1% of CaO, and 1% of $Al_2O_3$. The viscosity of this glass was measured and found to be $10^{6.3}$ poise at 800° C. and $10^6$ poise at 850° C. To perform overcoating, a solution was prepared which contained denatured alcohol and water as solvents and magnesium nitrate and aluminum nitrate provided as electrolytes, and in which the above glass material was dispersed; and glass powder was attached to the platinum wire by electrophoresis in such a manner that the platinum wire in the state shown in FIG. 2C was placed in the suspension for electrophoretic deposition as a cathode while an aluminum plate was placed in the same suspension as an anode, a voltage of 30V then being applied through the electrodeposition liquid between these electrodes. Thereafter, the thus-processed piece was sintered in an electric furnace at 800° C. for 6 minutes. The thickness of the glass was about 100 μm. FIG. 2E shows a state in which the core wire has been removed by immersing the sintered piece in a mixed acid composed of nitric acid and sulfuric acid at 80° C. for 1 hour. The glass became eroded by the mixed acid to a depth of 1 μm or less. The exothermic resistor 1 in the state shown in FIG. 2E has a strength sufficient enough to resist being broken when it is handled by a pincette, and it can be treated as a single element. It is therefore easy to handle in the succeeding assembly process, thus improving the ease with which operations relating to handling of the exothermic resistor can be performed.

Embodiment 2

Exothermic resistors of the structure shown in FIG. 1 were manufactured in the same manner as Embodiment 1 by using various types of glass.

Table 1 shows the compositions of glasses used. Table 2 shows the viscosity of each glass measured at 800° C. and 850° C., the temperature at which each piece was sintered, whether or not the platinum wire was embrittled, and whether or not each exothermic resistor was broken when it was handled by a pincette after the core wire had been removed. A state in which the glass became eroded during etching of the core wire such that the platinum wire was exposed and was partly unwound is included in the kinds of breakage to be put in the table.

As can be understood from Table 2, it is necessary for a glass having a viscosity higher than $10^7$ poise at 800° C. to be sintered at a temperature higher than 1200° C. Sintering at this temperature embrittles the platinum wire. A glass having a viscosity lower than $10^4$ poise may be sintered at a lower temperature, but it tends to erode during etching and is inferior in terms of strength.

Figure 14:
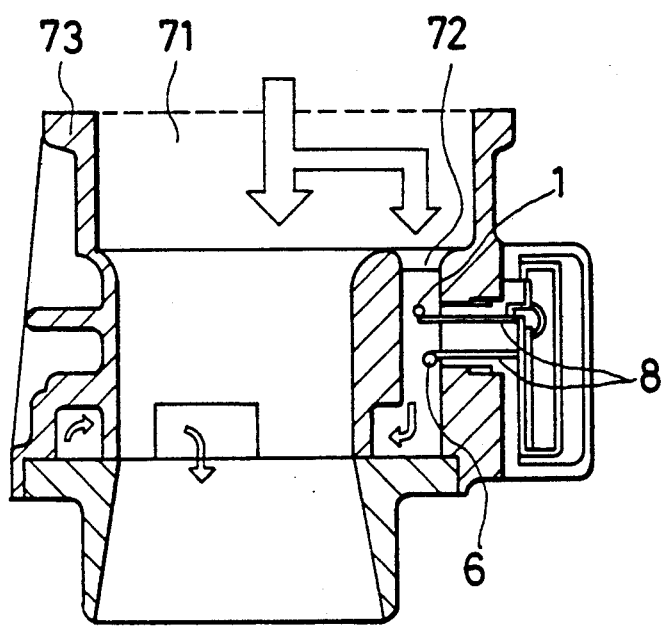
FIG. 14 is a cross-sectional view of a hot wire air flow meter.
Figure 16:
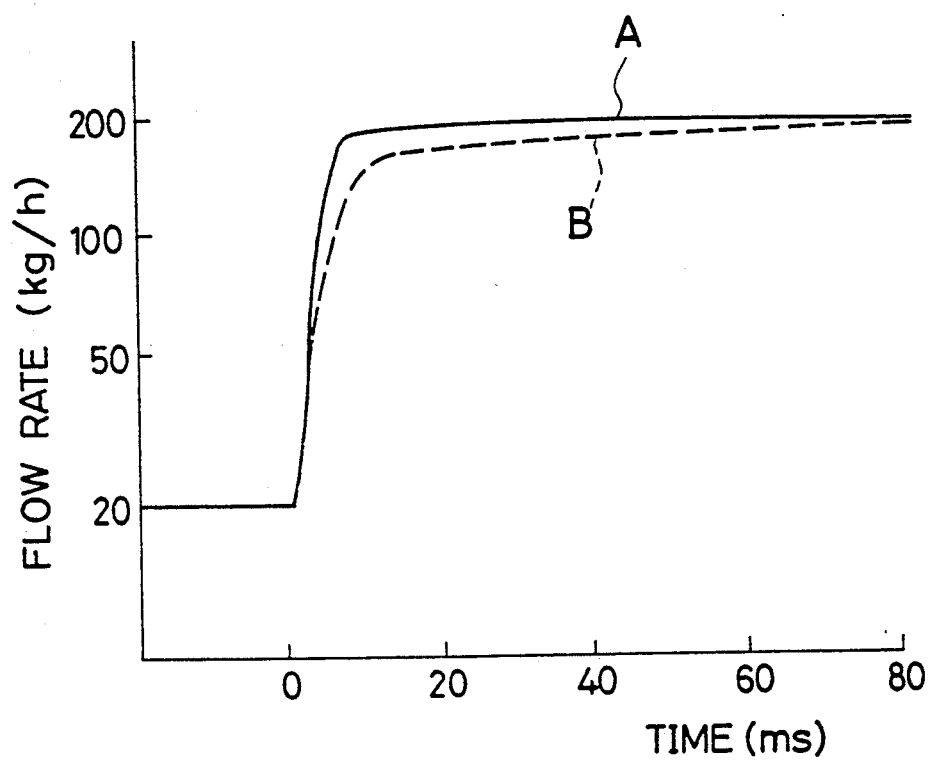
FIG. 16 is a graph of the response characteristics of the hot wire air flow meter shown in FIG. 14.

Of the exothermic resistors listed in FIG. 2, each of those free from embrittlement of the platinum wire and breakages (those making use of glasses b, e, f, h, and i) was used to constitute a hot wire air flow meter shown in FIG. 14. It was proved that, as shown in FIG. 16, response characteristics of hot wire air flow meters thereby made were superior than those of an air flow meter making use of the conventional bobbin-type exothermic resistor.

TABLE 1

| Glass | Composition (percent by weight) | | | | | | | | |
|---|---|---|---|---|---|---|---|---|---|
| a | $SiO_2$ 35, | PbO 58, | $K_2O$ 7 | | | | | | |
| b | $SiO_2$ 50, | PbO 35, | $K_2O$ 5, | $Na_2O$ 8, | $Al_2O_3$ 2 | | | | |
| c | $SiO_2$ 70, | PbO 12, | $K_2O$ 6, | $Na_2O$ 7, | CaO 5 | | | | |
| d | $SiO_2$ 60, | BaO 12, | MgO 5, | $Na_2O$ 12, | $Al_2O_3$ 11 | | | | |
| e | $SiO_2$ 65, | CaO 2, | BaO 13, | $K_2O$ 15, | $Al_2O_3$ 5 | | | | |
| f | $SiO_2$ 72, | CaO 4, | MgO 3, | $Na_2O$ 20, | $Al_2O_3$ 1 | | | | |
| g | $SiO_2$ 53, | $B_2O_3$ 9, | $Al_2O_3$ 20, | CaO, 15, | BaO 3 | | | | |
| h | $SiO_2$ 65, | $B_2O_3$ 18, | $Al_2O_3$ 7, | $Na_2O$ 6, | BaO 4 | | | | |
| i | $SiO_2$ 70, | $B_2O_3$ 16, | $Al_2O_3$ 4, | $K_2O$ 4, | PbO 6 | | | | |
| j | $SiO_2$ 80, | $B_2O_3$ 13, | $Al_2O_3$ 2, | $Na_2O$ 4, | CaO 1 | | | | |

TABLE 2

| Types of glass | Viscosity (poise) 800° C. | Viscosity (poise) 850° C. | Sintering temperature (°C.) | Embrittlement of platinum wire | Breakage |
|---|---|---|---|---|---|
| a | $10^4$ | $10^3$ | 690 | No | Yes |
| b | $10^{5.2}$ | $10^{4.7}$ | 730 | No | No |
| c | $10^{7.3}$ | $10^{6.6}$ | 1210 | Yes | No |
| d | $10^{4.6}$ | $10^{3.7}$ | 560 | No | Yes |
| e | $10^{5.5}$ | $10^5$ | 760 | No | No |
| f | $10^6$ | $10^{5.5}$ | 800 | No | No |
| g | $10^9$ | $10^{8.4}$ | 1250 | Yes | No |
| h | $10^{6.5}$ | $10^{5.8}$ | 760 | No | No |
| i | $10^{6.9}$ | $10^{6.1}$ | 860 | No | No |
| j | $10^{7.8}$ | $10^{6.9}$ | 1220 | Yes | No |

Embodiment 3

A molybdenum wire having a diameter of 0.5 mm was used as the core wire 5. A platinum wire was wound around this core wire, a resistor blank thereby formed was cut into pieces and a pair of lead wires were welded to each piece in the same manner as the manufacturing process shown in FIGS. 2A to 2C. Glass was attached to the welded portions and to the platinum wire by a dipping method, the composition of this glass consisting of, by weight, 74% of $SiO_2$, 9% of CaO, 8% of $K_2O$, 8% of $Na_2O$, and 1% of $Al_2O_3$. The viscosity of the glass was $10^{6.2}$ poise at 800° C. and $10^{5.5}$ at 850° C. The blank piece was thereafter heated in the electric furnace at 1000° C. for 30 minutes, thereby sintering the glass. In this case, the ambient atmosphere inside the electric furnace was atmospheric air, and the molybdenum core wire was removed during sintering by being oxidized and sublimated. An exothermic resistor similar to that shown in FIG. 2E was thus obtained.

The thus-obtained exothermic resistor had a work strength enough for the succeeding assembly process and a hot wire air flow meter making use of this exothermic resistor exhibited improved response characteristics, as shown in FIG. 16.

As can be understood from the foregoing, the present invention is effective irrespective of the method of coating glass and the method of removing the core wire.

Embodiment 4

Glass fiber filaments having a diameter of 10 μm were bundled to form a glass line having a diameter of 0.3 mm. This glass line was used as a core wire, and a platinum wire was wound around this core wire. A resistor blank thereby formed was cut into pieces, each having a length of 10 mm. Lead wires were welded to opposite ends of each piece. The same glass as that used in Embodiment 1 was attached to each piece by electrophoresis in such a manner that the core and the platinum wire, including the welded portions, were covered with the glass over the entire area thereof. The thickness of the glass was 2/5 of the thickness of the glass of Embodiment 1. Thus-formed piece was heated at 900° C. for ten minutes, thereby sintering the glass.

An exothermic resistor thereby obtained had a strength greater than that of the exothermic resistor of Embodiment 1 and was not broken when dropped from a level of 1 m high to the floor. The rising rate of response characteristics was slightly higher than that in the case of Embodiment 3, but it was reduced when the flow rate was higher than about 100 kg/h and it was substantially equal to that in the case of the third embodiment with respect to a range of response time after 30 ms.

Embodiment 5

An exothermic resistor of the type shown in FIG. 2E was manufactured. In this case, the thickness of glass coated and sintered was set to a half of that of the first embodiment. Another glass having a composition consisting of, by weight, 35% of $SiO_2$, 58% of PbO, and 7% of $K_2O$ was dispersed in an organic solvent, and a cavity of the blank piece formed by removing the core wire was filled with this dissolved glass. The blank piece with the glass was heated and sintered in the electric furnace at 650° C. for ten minutes.

The second glass filling the cavity and subjected to baking had many pores. However, the obtained exothermic resistor exhibited a strength substantially equal to that of the exothermic resistor of the first embodiment, and it also exhibited response characteristics similar to those of the third embodiment.

Embodiment 6

Figure 3:
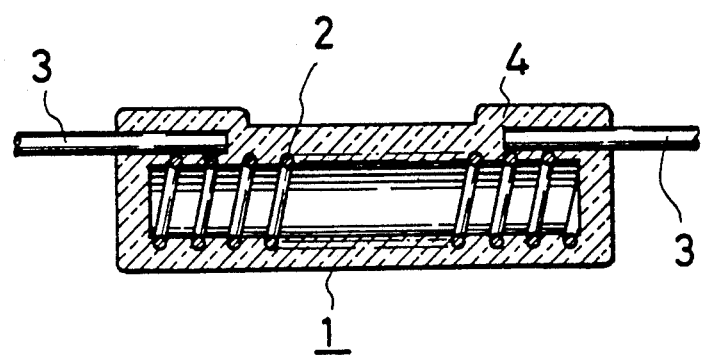
FIG. 3 is a longitudinal cross-sectional view of an exothermic resistor for use in another embodiment of the present invention.

FIG. 3 shows the structure of an exothermic resistor for a hot wire air flow meter which represents a further embodiment of the present invention.

A glass member 4 in the form of a cylindrical tube shown in FIG. 3 is provided with a length of platinum wire 2 which extends helically in the inner surface of the cylindrical glass member such that the coil thereby formed is coaxial with the glass member 4. Opposite ends of this platinum wire coil 2 are connected to a pair of lead wires 3 supported on the glass member 4 so that the coil is electrically led to the outside of the glass member 4. The glass member 4 is closed at its both ends by the same material as itself.

Embodiment 7

A method of manufacturing an exothermic resistor of this structure will be described below with reference to FIGS. 4A to 4D.

Figure 4A:
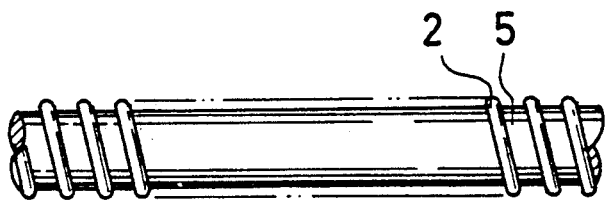
FIGS. 4A to 4D are diagrams of the process of manufacturing the exothermic resistor shown in FIG. 3.
Figure 4B:
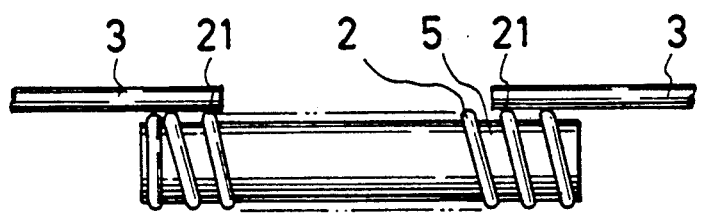
Figure 4C:
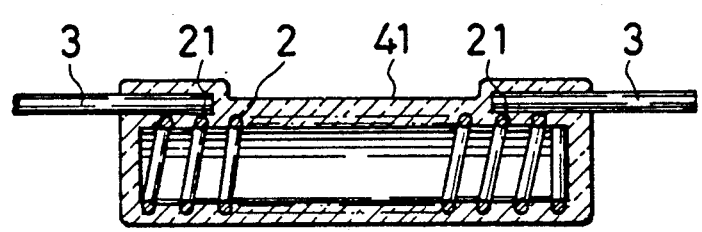
Figure 4D:
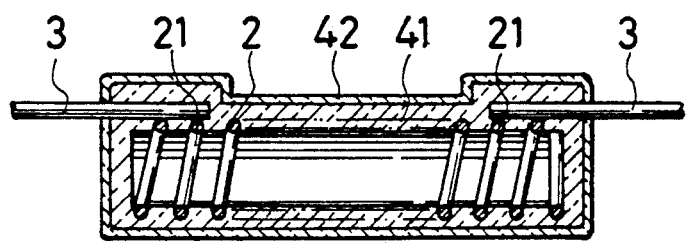
Figure 4E:
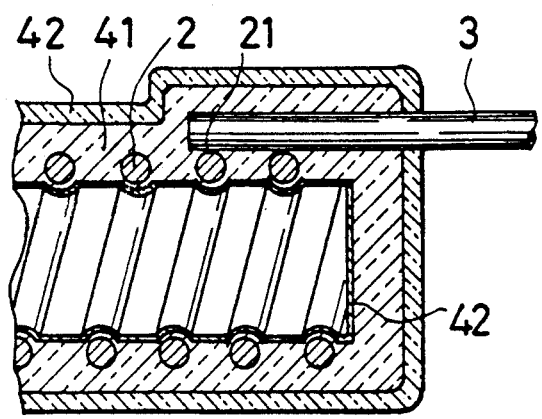
FIG. 4E is an enlarged illustration of a portion of the exothermic resistor shown in FIG. 4D.

As shown in FIG. 4A, a length of platinum wire 2 having a diameter of 20 μm is continuously wound by an automatic winding machine around the core wire 5 made of molybdenum and having a diameter of 0.4 mm. As shown in FIG. 4B, the resistor blank shown in FIG. 4A is cut into pieces, each having a length of about 6 mm for one exothermic resistor, and a pair of lead wires 3 having a diameter of 0.13 mm and made of a platinum-iridium alloy are welded to opposite ends of each piece at connections 21. Then, as shown in FIG. 4C, a glass material 41 is applied, by electrophoresis, over outer surfaces of each piece formed by cutting from the molybdenum core wire 5 and the platinum wire 2 wound around the core wire and is baked in an oxidizing atmosphere. The glass material 41 is, for example, a $SiO_2$—$B_2O_3$—$PbO$ glass having a viscosity of $10^{6.5}$ poise at 800° C. and a viscosity of $10^{4.2}$ at 850° C. As the temperature in the sintering process of the glass material 41 rises, oxidation of the molybdenum core wire 5 is promoted so that the core material becomes $MoO_3$. When heated at 795° C., $MoO_3$ is sublimated while the glass material 41 having a viscosity of $10^{6.5}$ at 800° C. maintains sufficient open pores, so that sublimated $MoO_3$ is dispersed through the open pores between particles of the glass material 41, thus removing the molybdenum core wire 5. Thereafter, the temperature was held at 950° C. for 20 minutes, thereby completing sintering of the glass material. During this process, the glass material 41 reacts with sublimated $MoO_3$ and the fluidity of the glass is thereby reduced so that the glass becomes porous and the smoothness of the glass surface becomes inadequate. For this reason, a secondary layer of glass material 42 is formed over the surface of the glass 41, and is baked in an oxidizing atmosphere by the electric furnace. The glass material 42 is, for example, a $ZnO$—$B_2O_3$—$SiO_2$ glass having a viscosity of $10^8$ poise at 600° C. and a viscosity of $10^4$ poise at 690° C. During sintering at 720° C. for 20 minutes, the glass material 42 adequately fills pores of the porous primary layer of glass 41 and forms a smooth outer surface, thereby completing the exothermic resistor 1 shown in FIG. 3. In the case of the exothermic resistor obtained by this method, that is, by being covered with the secondary glass layer 42 after the molybdenum core wire has been removed and by being thereafter sintered, the glass layer extends even inside the coil formed by the platinum wire 2, as shown in FIG. 4E by being enlarged, so that the platinum wire 2 can be supported more securely.

In the thus-constructed exothermic resistor, the cylindrical glass member having the inner surface in which the coil is formed is closed at its both ends. Therefore there is no possibility of dust or ionic substances becoming attached to the inner surface of the glass member or filling the inner space of the glass member. In consequence, there is no possibility of any extraneous substance entering the area in the vicinity of the coil. It is thereby possible to stabilize the performance of the exothermic resistor with respect to thermal or electrical effects.

The above method of manufacturing the exothermic resistor is advantageous because the sublimation of the core can be effected simultaneously with sintering of the glass member if the core wire 5 is made of, for example, molybdenum. It is thus possible to remove the core without performing any special processing such as etching. This contributes to simplification of the manufacturing operations.

Embodiment 8

Another example of the method of manufacturing the type of exothermic resistor shown in FIG. 3 will be described below.

Figure 5:
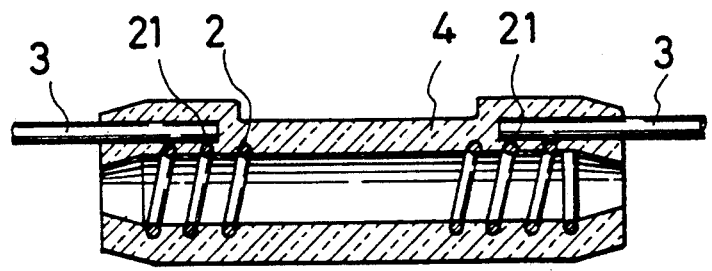
FIG. 5 is an illustration of another example of the method of manufacturing the exothermic resistor in accordance with the present invention.

A length of platinum wire 2 having a diameter of 20 μm is continuously wound by an automatic winding machine around the core wire 5 made of molybdenum and having a diameter of 0.4 mm. A resistor blank thereby formed is cut into pieces each having a length of about 6 mm for one exothermic resistor element or body. The lead wires 3 having a diameter of 0.13 mm and made of a platinum-iridium alloy are welded to opposite ends of each piece at the connections 21. By electrophoresis, the glass material 4 is attached to outer surfaces of the molybdenum core wire 5 and the platinum wire 2 except for opposite ends of the molybdenum core 5. Thus-prepared blank piece is sintered in an oxidizing atmosphere by the electric furnace. FIG. 5 shows the state of the blank piece after this sintering. In this case, the glass material 4 is, for example, a $ZnO$—$B_2O_3$ glass which has a viscosity of $10^4$ poise at 680° C. and which crystallizes at 750° C. and remelts at a temperature higher than about 1000° C. As the temperature in the sintering process of the glass material 4 rises, oxidation of the molybdenum core wire 5 is promoted so that the core material becomes $MoO_3$. The softened glass is sealed at 680° C. and crystallize at 750° C. so that the shape of the glass is stabilized. The sintering temperature is thereafter raised so that $MoO_3$ is sublimated, thereby removing the molybdenum core 5. The sintering is thereafter continued at 950° C. for 20 minutes before it is finished. After the sintering has been completed, openings through which sublimated $MoO_3$ is dispersed are left at opposite ends of the glass member 4. These openings are closed by melting the glass by the heat of a flame, thereby obtaining an exothermic resistor of the type shown in FIG. 3.

Embodiment 9

Still another example of the method of manufacturing the type of exothermic resistor shown in FIG. 3 will be described below.

A length of platinum wire 2 having a diameter of 20 μm is wound by an automatic winding machine around the core wire 5 made of molybdenum and having a diameter of 0.4 mm. A resistor blank thereby formed is cut into pieces each having a length of about 6 mm for one exothermic resistor element or body. The lead wires 3 having a diameter of 0.13 mm and made of a platinum-iridium alloy are welded to opposite ends of each piece at the connections 21. A coating of the glass material 4 is formed by electrophoresis. Thereafter, the thus-prepared blank piece is sintered in an oxidizing atmosphere by the electric furnace. FIG. 3 shows the state of the blank piece after this sintering. In this case, an $Al_2O_3$—$P_2O_4$ glass having a viscosity of $10^{6.7}$ poise at 820° C. and a viscosity of $10^4$ poise at 910° C. is selected as the glass material 4. As the temperature in the sintering process of this glass material rises, the molybdenum core wire 5 is oxidized and sublimated at 795° C. so that it is removed. The baking is thereafter continued at 1080° C. for 1 hour before it is finished, thus obtaining an exothermic resistor of the type shown in FIG. 3.

As described above, the present invention was exemplified with respect various compositions of the glass material 4 shown in FIG. 3. If a glass material has a viscosity higher than $10^4$ poise at 800° C. and a viscosity lower than $10^7$ poise at 1000° C., it can be used to form the type of exothermic resistor shown in FIG. 3. Also, glass materials of various compositions were tried with respect to the method in which the glass is formed as shown in FIG. 5. If a glass material is crystalizable at any temperature lower than 790° C. and capable of maintaining its shape at a temperature lower than 900° C., it can be used to form the type of exothermic resistor shown in FIG. 3.

In the above described embodiments, electrophoresis is utilized to form the glass coating. However, methods other than the method of using electrophoresis, including a method of applying a glass material in the form of paste, are applicable to the manufacture of the exothermic resistor 1 shown in FIG. 3.

Embodiment 10

Figure 6:
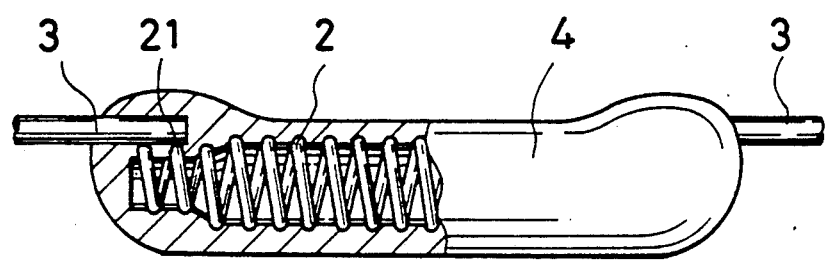
FIG. 6 is a longitudinal cross-sectional view of an exothermic resistor for use in still another embodiment of the present invention.

FIG. 6 shows the structure of an exothermic resistor which represents a still further embodiment of the present invention. Lead wires 3 made of a platinum-iridium alloy are connected to opposite ends of a length of exothermic resistance wire 2 in the form of a coil made of platinum. The exothermic resistance wire 2, including connections 21, is covered with a layer of composite material 4 composed of ceramic and glass materials which constitute a support member.

A method of manufacturing this type of exothermic resistor will be described below with reference to FIGS. 7A to 7E.

Figure 8:
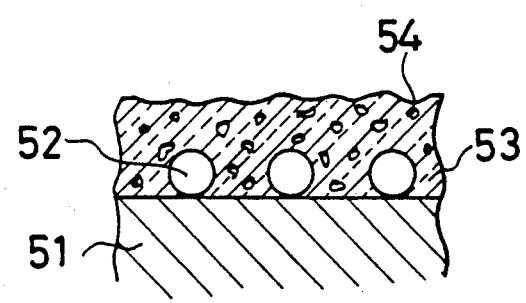
FIG. 8 is a cross-sectional view of a state in which ceramic and glass materials are attached to an exothermic resistance wire wound around a core wire.
Figure 7A:
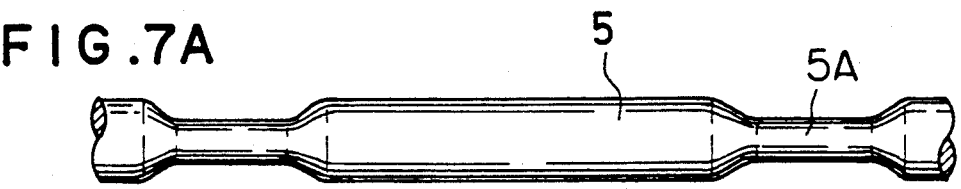
FIGS. 7A to 7E are diagrams of the process of manufacturing the exothermic resistor shown in FIG. 6.
Figure 7B:
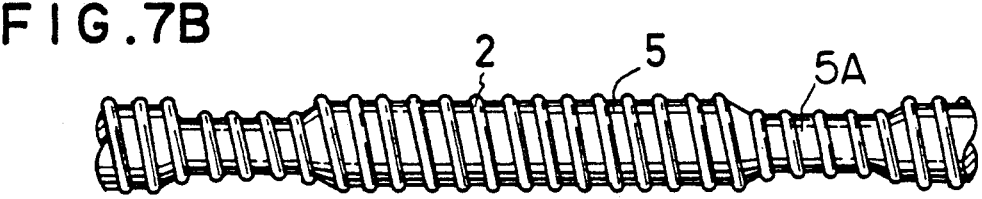
Figure 7C:
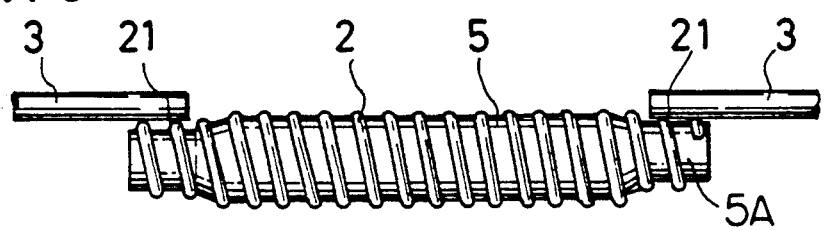
Figure 7D:
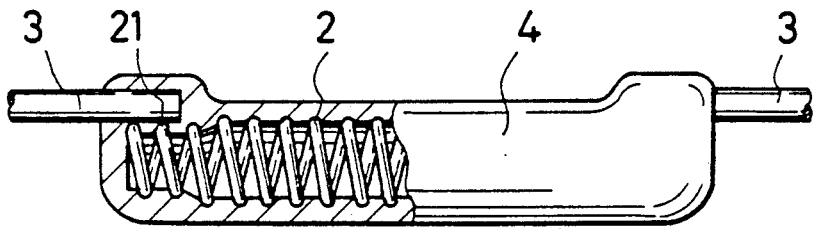
Figure 7E:
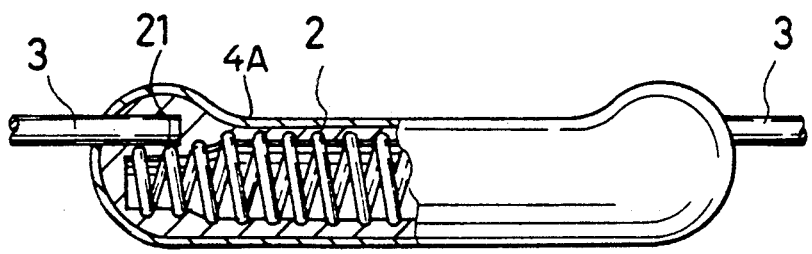

FIG. 7A shows a molybdenum core wire 5 having a diameter of 0.5 mm and provided as the core around which the platinum wire is to be wound. The core wire 5 has circular column portions having a length of 5 mm and flat portions 5A having a length of 2 mm, the circular column portions and the flat portions 5A being alternately disposed. As shown in FIG. 7B, a length of platinum wire (exothermic resistor) 2 having a diameter of 30 μm was wound by an automatic winding machine around the core wire 5 over a length for two or more resistor elements. As shown in FIG. 7C, a resistor blank thereby formed was cut at the centers of the flat portions into pieces, and a pair of lead wires 3 made of a platinum-iridium alloy and having a diameter of 0.13 mm were welded to opposite ends of each piece at the connections 21. The flat portions 5A were provided with a view to improving the facility with which the lead wires 3 was placed on and attached to the core wire 5. The flat portions were formed by plastic working based on pressing. It is preferable in terms of ease of working that the flat portions are made symmetrical about a horizontal plane. As shown in FIG. 7D, the composite member 4 was formed over the exothermic resistance wire 2 and is thereafter sintered. To apply a material to form this layer, a solution was prepared which contained denatured alcohol and water as solvents and magnesium nitrate and aluminum nitrate provided as electrolytes, and in which particles of alumina and powder of PbO—$SiO_2$ glass mixed at a ratio: 95:5 were dispersed; and particles of the alumina and the glass were attached to the platinum wire by electrophoresis in such a manner that the platinum wire in the state shown in FIG. 7C was placed in the suspension for electrophoretic deposition as a cathode while an aluminum plate was placed in the same suspension as an anode, a voltage of 40V then being applied through the suspension for electrophoretic deposition between these electrodes. FIG. 8 schematically illustrates this state of coating in which a glass-alumina layer 53 having pores 54 and constituting a porous layer was coated to outer surfaces of the platinum wire 52 wound around the molybdenum core wire 51. As shown in FIG. 7D, the thus-prepared piece was heated in the electric furnace at 900° C. for 1 hour so that the molybdenum core wire was oxidized and sublimated, and this piece was heated at 1100° C. for 30 minutes, thereby sintering the electrocoating layer. The thickness of the sintered layer 4 was about 80 μm. The softening temperature of the glass used to form this layer was 850° C., and the sintered layer 4 became porous but had a strength large enough to prevent itself from breaking during handling. As shown in FIG. 7E, this layer was coated with powder of PbO—$B_2O_3$—$SiO_2$ glass having a softening temperature of 680° C. and thereafter underwent baking at 850° C. for 90 minutes so that this glass permeated through the sintered layer 4, thereby forming a composite material layer 4A. From observation of a cross-section of the thus-obtained exothermic resistor, it was found that the coating glass formed a surface layer and also reached the cavity formed by the removal of the molybdenum core wire, thereby forming a continuous phase. The volume percent of the glass contained in the composite material layer was 32%, and the force required to crush the thus-obtained exothermic resistor is 2.1 kg while the anti-crushing strength of a resistor manufactured by the conventional technique is about 0.5 kg at most.

Embodiment 11

A wire having a diameter of 0.5 mm and made of a Ni-Fe alloy having a 53% nickel content was used as the core wire. In the same process as that shown in FIGS. 7A to 7E, a platinum wire was wound around this core wire, a resistor blank thereby formed around the core wire was cut into pieces, and lead wires were welded to each cut piece. Alumina particles were coated to the welded portions and to the platinum wire by a dipping method. This method resides in a process in which a solution is prepared by dispersing alumina particles in an organic solvent (terpineol); and the exothermic resistor blank constituted by the core, the platinum wire wound around the core and the lead wires connected to the platinum wire is dipped in this solution and is taken out therefrom, thereby coating alumina particles to the exothermic resistor. In this case, one end of the core was not coated with alumina particles. Each blank piece was heated at 1500° C. for 2 minutes, thereby sintering the alumina. The blank piece was thereafter immersed in a mixed acid composed of nitric acid and sulfuric acid at 80° C. for 3 hours, thereby removing the core by the etching manner. The resistor piece was thereafter coated with powder of $PbO—SiO_2$ glass having a softening temperature of 600° C. and thereafter underwent baking at 820° C. for 90 minutes so that this glass permeated through the baked alumina layer, thereby forming a composite material layer. The anti-crushing strength of the thus-obtained exothermic resistor was 1.8 kg, and the volume percent of the glass in the composite material layer was 41%.

Embodiment 12

Exothermic resistors similar to those of Embodiments 10 and 11 and having glass components of different volume percents in the composite material layers were manufactured. Of these exothermic resistors, one having a glass component of a smaller volume percent was manufactured in such a manner that ceramic particles and glass particles were simultaneously coated, at a desired mixing ratio, to the platinum wire by electrophoresis in the same manner as in the case of Embodiment 10 and were sintered under conditions for enabling the glass to suitably melt. The exothermic resistor was completed without performing the succeeding glass coating. To form each of exothermic resistors of this type, composite material particles were preliminarily formed by mixing ceramic particles and glass particles at a desired ratio, heating this mixture so that the glass was molten, cooling to solidify the same, and pulverizing the composite material thereby obtained; and the composite material particles thereby formed were coated to the platinum wire, thereby improving the uniformity of the materials constituting the composite material layer. Since, in the case of attachment of particles based on the electrophoresis method, action of electric charges on the surfaces of particles is utilized, the manner of attachment varies depending upon the type of particle. For this reason, the ceramic and the glass are not always attached while being maintained at the same compounding ratio as that at which they are originally mixed, and there is therefore a possibility of occurrence of non-uniformity of the compounding ratio with respect to the area over which the mixed particles are attached. However, it is possible to avoid this problem by preparing composite material particles each of which contains the ceramic and glass materials mixed at a predetermined compounding ratio. Silicon carbide, silicon nitride and aluminum nitride were also used as ceramic components other than the alumina. Thermal conductivities of alumina, silicon carbide, silicon nitride, and aluminum nitride are 21 W/m.K, 40 W/m.K, 12 W/m.K, and 21 W/m.K, respectively. When these materials other than the alumina were used, sintering after the coating of the composite material was performed in an inert gas.

Figure 9:
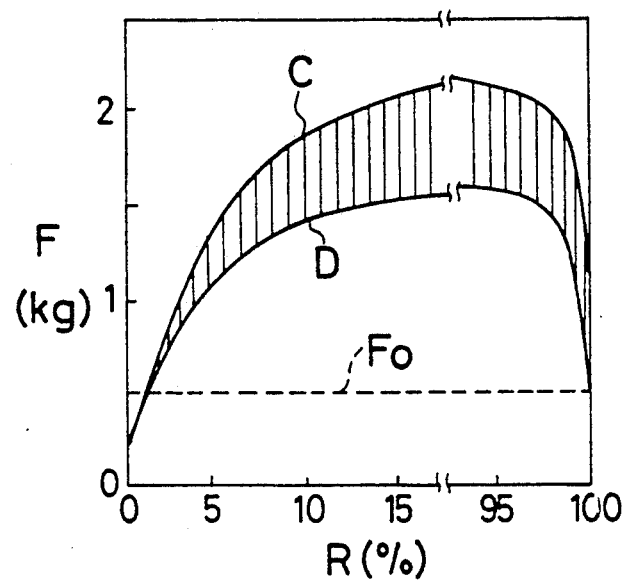
FIG. 9 is a graph of the relationship between the volume percent of the glass component and the anti-crushing strength.
Figure 10:
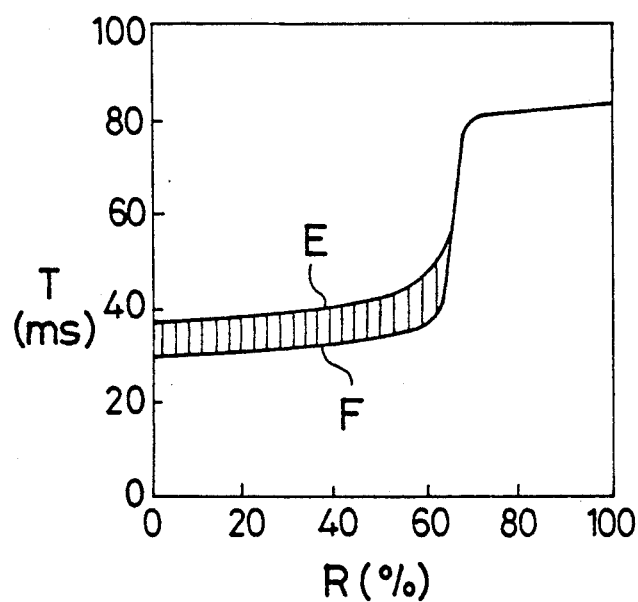
FIG. 10 is a graph of the relationship between the volume percent of the glass component and the response time.

The anti-crushing strength and the response time were examined with respect to exothermic resistors thereby manufactured. FIG. 9 shows the relationship between the ratio of the volume of glass component to the volume of the composite material layer (volume percent) and the anti-crushing strength, the abscissa representing the volume percent R and the ordinate representing the anti-crushing strength F (kg). The broken line $F_0$ indicates a level of anti-crushing strength required for an ordinary exothermic resistor, and the anti-crushing strengths of the exothermic resistors manufactured in accordance with the present invention fall into a region between the solid lines C and D. The anti-crushing strength varies over a certain range depending upon factors including the type of ceramic component of the composite material. FIG. 10 shows the relationship between the volume percent of the glass component and the response time, the abscissa representing the volume percent R and the ordinate representing the response time T (ms). The response time also varies depending upon factors including the type of ceramic component of the composite material.

When the volume percent of the glass component of the composite material layer was less than 2%, the strength of the layer was so small that it was impossible to handle the resistor piece by employing a pincette or the like. After the composite material had been sintered at a high temperature for a long time in order to increase the strength, the characteristics of the platinum wire changed, which impaired the desired characteristics of the exothermic resistor.

When the volume percent of the ceramic component of the composite material layer was less than 40%, that is, the volume percent of the glass component was higher than 60%, the response characteristics of the resulting air flow meter became deteriorated as in the case where the platinum wire was covered with glass alone. As a result, effects specific to the composition of the ceramic and glass materials were not obtained.

Embodiment 13

Figure 11A:
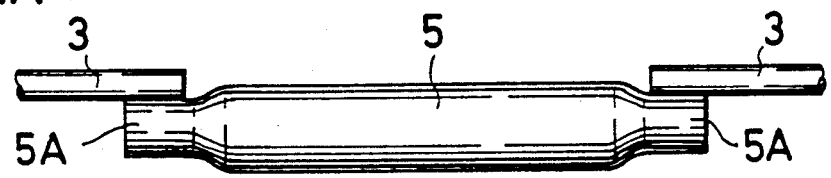
FIGS. 11A to 11D are diagrams of another example of the method of manufacturing the exothermic resistor shown in FIG. 6.
Figure 11B:
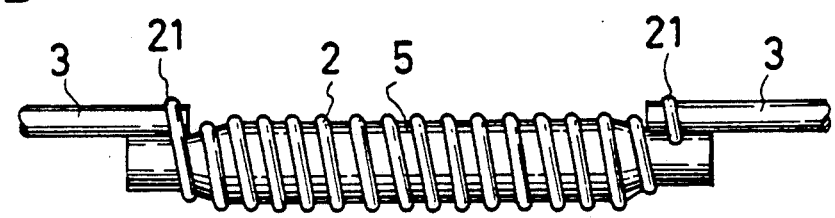
Figure 11C:
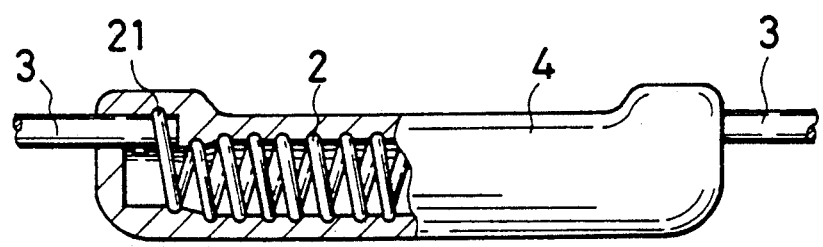
Figure 11D:
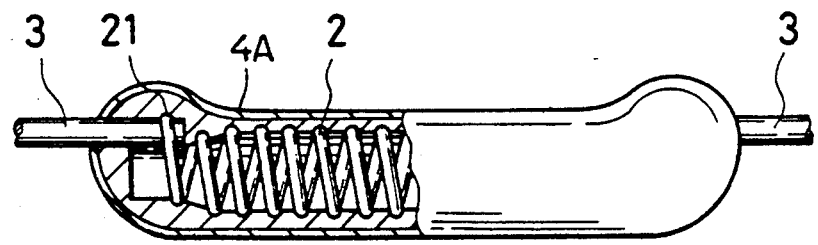

In the case of Embodiments 10 to 12, the wire to be used as an exothermic resistance element was continuously wound around the core wire, the resistor blank thereby formed was cut into pieces each having a desired length, and the lead wires were connected to each piece. In this embodiment, however, the core wire is cut into pieces each having a desired length; a pair of lead wires are connected to opposite ends of each cut core wire; one end of a wire to be used as an exothermic resistance element was connected to one of the pair of lead wires; and the other end of the resistance wire is connected to the other lead wire after the resistance wire has been wound around the core wire. FIGS. 11A to 11D show procedures of manufacturing an exothermic resistor in this manner. As shown in FIG. 11A, a pair of lead wires having a diameter of 0.13 mm and made of a platinum-iridium alloy are connected to flat portions of a molybdenum core wire 5 having a diameter of 0.5 mm, the flat portions being formed at opposite ends thereof. As shown in FIG. 11B, one end a platinum wire (exothermic resistor) 2 having a diameter of 30 μm is welded to one of the pair of lead wires 3 at a connection 21, and the other end of the platinum wire 2 is welded to the other lead wire 3 at another connection 21 after it has been wound around the core wire 5. As shown in FIG. 11C, a composite material is applied over the exothermic resistance wire 2 and is baked. As shown in FIG. 11D, the resistor piece is coated with glass powder and thereafter undergoes sintering so that the glass permeates through the sintered layer 4, thereby forming a composite material layer 4A.

Embodiment 14

Figure 12A:
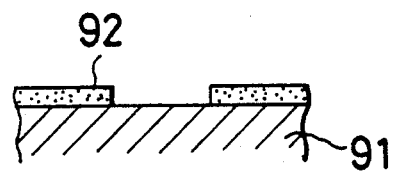
FIGS. 12A to 12D are cross-sectional views of the process of manufacturing an exothermic resistor with a film circuit.
Figure 12B:
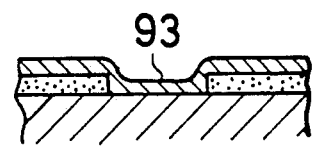
Figure 12C:
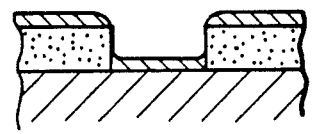
Figure 12D:
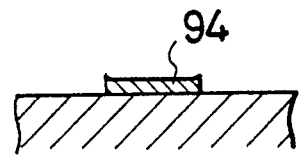
Figure 13:
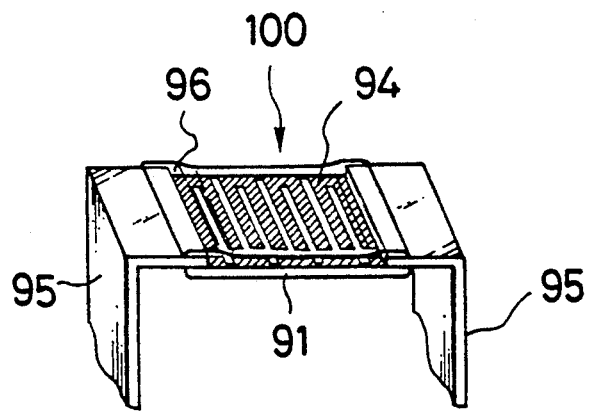
FIG. 13 is a perspective view of an exothermic resistor with a film circuit for use in a further embodiment of the present invention.

A type of exothermic resistor formed on an alumina substrate will be described below with reference to FIGS. 12A to 12D and FIG. 13. A circuit 94 was formed by a lift-off method on an alumina substrate 91 having a width of 4 mm, a length of 10 mm, and a thickness of 0.3 mm. FIG. 12A to 12D show main procedures based on the lift-off method by illustrating cross-sectional views of the exothermic resistor; FIG. 12A shows a step of forming a mask 92 on the substrate 91 from a photoresist; FIG. 12B, a step of forming a film over the substrate and the mask by applying a platinum paste 93 thereto; FIG. 12C, a step of cutting the film by dilating the resist by a developer; and FIG. 12D, a step of removing the mask 92 by an etching manner and thereafter completing the platinum circuit 94 by baking. The pattern of the platinum film circuit was formed while the width of circuit lines was set to 400 $\mu$m and the distance between the lines was set to 100 $\mu$m. The resistance of this circuit was 12 $\Omega$. The pattern had at its opposite ends portions of large areas to which a pair of lead wires 95 made of a platinum-iridium alloy were connected by brazing. A paste containing a PbO—SiO$_2$ glass having a softening temperature of 600° C. and alumina, the ratio of the proportions of the glass and the alumina being 2:3, was applied over the platinum thick film circuit and was sintered at 800° C. for 15 minutes, thereby forming a composite material layer 96. The response speed of an air flow meter constituted by employing the thus-obtained exothermic resistor 100 was twice as high as that in the case there the circuit was coated with glass alone.

FIG. 14 shows a hot wire air flow meter which makes use of the exothermic resistor 1 of the present invention. In this air flow meter, a resistor 6 for measuring the temperature of air which is the same as the exothermic resistor 1 is used in combination with the exothermic resistor 1. As shown in FIG. 14, the exothermic resistor 1 and the resistor 6 for measuring the temperature of air are secured to a support 8 disposed in a bypass passage 72 which is formed in a body 73 and which bypasses part of intake air the majority of which flows through a main passage 71 also formed in the body 73.

Figure 15:
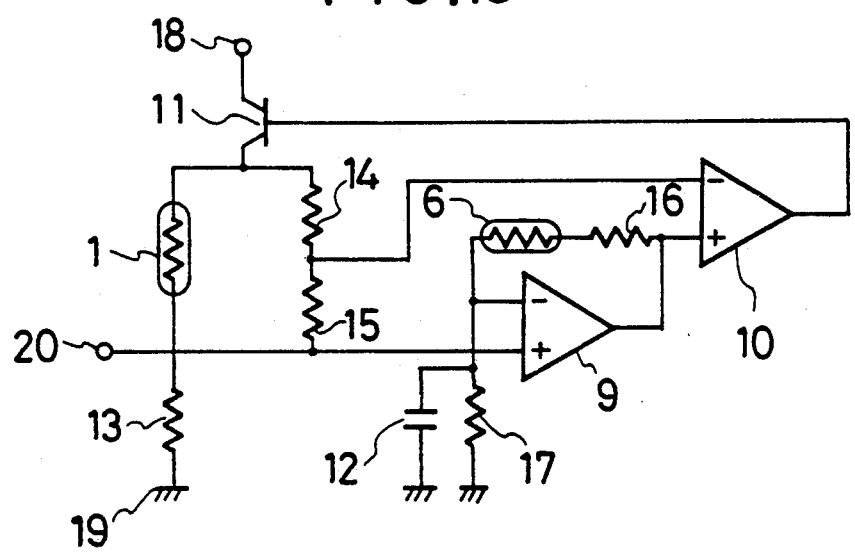
FIG. 15 is a circuit diagram of a driving circuit of the hot wire air flow meter shown in FIG. 14.

FIG. 15 shows a circuit for driving the hot wire air flow meter, constituted by the exothermic resistor 1, the air temperature measurement resistor 6, operational amplifiers 9 and 10, a power transistor 11, capacitor 12, and resistors 13 to 17. The plus terminal of a battery (not shown) is connected to the collector terminal 18 of the power transistor 11 while the minus terminal of the battery is connected to a grounding terminal 19 of the resistor 13. An input terminal of a microcomputer (not shown) for controlling an engine by using signals output from the hot wire air flow meter is connected to a connection 20 between the resistor 13 and the exothermic resistor 1.

In the thus-constructed circuit, an electric current is supplied to the exothermic resistor 1 by the power transistor 11 in order to heat up the exothermic resistor, and the temperature of the exothermic resistor is controlled in such a manner that it is kept higher than that of the air temperature measurement resistor 6 by constant degrees. During this control, the air temperature measurement resistor 6 is used to correct the temperature of the intake air by detecting this temperature while allowing only a very weak current to flow through the air temperature measurement resistor 6 such that the heat generated by this current is negligible. As the air flows while colliding with the exothermic resistor 1, the driving circuit performs the control operation to constantly maintain the difference between the temperatures of the exothermic resistor 1 and the air temperature measurement resistor 6, as described above. This operation is performed in a feedback manner such that a voltage obtained by dividing the voltage across the exothermic resistor 1 by means of the resistors 14 and 15 is constantly kept equal to a voltage amplified by the operational amplifier 9 from a voltage drop across the resistor 13 proportional to the current flowing through the exothermic resistor 1. In consequence, as the air flow rate changes, the current flowing through the exothermic resistor 1 changes, and the air flow rate is measured from the voltage drop that appears across the resistor 13 in response to the current.

FIG. 16 shows a graph of response characteristics of this hot wire air flow meter in accordance with the present invention. The abscissa represents the time (ms) and the ordinate represents the flow rate (kg/h). The voltage output from the hot wire air flow meter was measured when the air flow rate was changed from a low flow rate of about 20 kg/h to a high flow rate of about 200 kg/h. This voltage was converted into the flow rate to be plotted along the ordinate. The curve B indicates a characteristic of the air flow meter making use of the conventional bobbin-type exothermic resistor, and the curve A indicates a characteristic of the air flow meter in accordance with the present invention in comparison with the former. As can be understood from this graph, the present invention ensures that the time taken for the flow meter to output the final value can be remarkably reduced.

It is therefore possible for the hot wire air flow meter to output signals correctly in response to actual changes in the air flow rate even at the time of rapid acceleration or deceleration of the vehicle, thereby optimizing the determination of the injection rate of the injector and solving the problem of surging.

This remarkable improvement in the response performance is attained for the reason that the exothermic resistor 1 can rapidly react to a change in the air flow rate since the heat generating in the platinum wire 2 of the exothermic resistor 1 is almost entirely transmitted to the air without heating the bobbin or core or being transmitted to the support via the bobbin as in the case of the conventional bobbin-type exothermic resistor.

A type of anemometer was also manufactured which was designed to utilize a combination of the exothermic resistor of the present invention and a circuit for detecting the temperature from a change in the resistance value of this resistor and converting it into the wind velocity. As a result, this anemometer also exhibited improved response characteristics.

What is claimed is:

1. A method of manufacturing an air flow meter, comprising the steps of: preparing a blank constituted by a core wire having a desired length, a wire wound around said core wire, so as to provide a wound wire, and used as an exothermic resistance wire, and a pair of lead wires connected to opposite ends of said wound wire; coating ceramic particles to said wound wire over the entire surface thereof and thereafter sintering said ceramic particles; removing said core wire; and forming a layer of composite material by coating the layer of said sintered ceramic material with molten glass so that said glass permeates into said layer of sintered ceramic material.

2. A method of manufacturing an air flow meter according to claim 1, wherein said core wire has flat portions formed at its opposite ends.

3. A method of manufacturing an air flow meter according to claim 1, wherein the ceramic material has a thermal conductivity of 10 W/m.K.

4. A method of manufacturing an air flow meter, comprising the steps of: preparing a blank constituted by a core wire having a desired length, a wire wound around said core wire, so as to provide a wound wire, and used as an exothermic resistance wire, and a pair of lead wires connected to opposite ends of said wound wire; forming a layer of composite material by coating ceramic and glass particles to said wound wire over the entire surface thereof and thereafter sintering said ceramic and glass particles; and removing said core wire.

5. A method of manufacturing an air flow meter according to claim 4, wherein said ceramic particles attached to said wound wire includes particles of a composite material composed of ceramic and glass materials.

6. A method of manufacturing an air flow meter according to claim 4, wherein the core wire has opposed ends in a direction of the desired length, and wherein in the step of forming the layers of composite material the ceramic and glass particles are coated over the opposed ends and thereafter sintered.

7. A method of manufacturing an air flow meter according to claim 4, wherein material of the ceramic particles has a thermal conductivity of 10 W/m.K.

8. A method of manufacturing an air flow meter according to claim 7, wherein the glass particle component of the composite material is 2 to 60 volume percent of the composite material.

9. A method of manufacturing an air flow meter, comprising the steps of: preparing a blank constituted by a core wire having a desired length, a wire wound around said core wire, so as to provide a wound wire, and used as an exothermic resistance wire, and a pair of lead wires connected to opposite ends of said wound wire, said core wire being made of a sublimatable material; coating ceramic particles to said wound wire over the entire surface thereof and thereafter sintering said ceramic particles; removing said core wire by heat treatment so as to sublimate the sublimatable material; and forming a layer of composite material by coating the layer of said sintered ceramic material with molten glass so that said glass permeates into said layer of sintered ceramic material.

10. A method of manufacturing an air flow meter according to claim 9, wherein said core wire has flat portions formed at its opposite ends.

11. A method of manufacturing an air flow meter, comprising the steps of: preparing a blank constituted by a core wire having a desired length, a wire wound around said core wire, so as to provide a wound wire, and used as an exothermic resistance wire, and a pair of lead wires connected to opposite ends of said wound wire, said core wire being made of a sublimatable material; forming a layer of composite material by coating ceramic and glass particles on said wound wire over the entire surface thereof and thereafter sintering said ceramic and glass particles; and sublimating the sublimatable material so as to remove said core wire, the sublimating being performed by heat treatment.

12. A method of manufacturing an air flow meter according to claim 11, wherein said ceramic particles attached to said wound wire includes particles of a composite material composed of ceramic and glass materials.

13. A method of making an exothermic resistor for an air flow meter, comprising steps of:
   (1) providing a blank constituted by a resistor wire wound around a sublimatable core material, the resistor wire having opposed ends, the core material having opposite ends adjacent the opposed ends of the resistor wire;
   (2) connecting a respective lead wire to the opposed ends of the resistor wire;
   (3) forming a porous ceramic material coating on the resistor wire, the porous ceramic material coating having closed ends at the opposed ends of the resistor wire; and
   (4) effecting sublimation of the sublimatable core material to remove the sublimatable core material.

14. A method of making an exothermic resistor for an air flow meter according to claim 13, wherein the step of forming the porous ceramic coating includes forming the porous ceramic coating on exposed surfaces of the resistor wire and the core material, including on the opposite ends of the core material.

15. A method of making an exothermic resistor for an air flow meter according to claim 14, wherein the porous ceramic coating is provided on all exposed surfaces of the resistor wire and the sublimatable core material such that the porous ceramic coating is a continuous coating.

16. A method of making an exothermic resistor for an air flow meter according to claim 14, including the further step of applying a molten glass to the porous ceramic coating so as to fill pores of the porous ceramic coating with the glass.

17. A method of manufacturing an air flow meter according to claim 13, wherein said sublimation of the sublimatable core is effected by heating.

18. A method of manufacturing an air flow meter, comprising the steps of: preparing a blank constituted by a core wire having a desired length, a wire wound around said core wire, providing a wound wire, and used as an exothermic resistance wire, and a pair of lead wires connected to opposite ends of said wound wire; forming a layer of composite material by coating ceramic and glass particles to said wound wire over the entire surface thereof and thereafter sintering said ceramic and glass particles; coating said layer of composite material with molten glass after the composite material layer has been formed; and removing said core wire.

19. A method of manufacturing an air flow meter, comprising the steps of: preparing a blank constituted by a core wire having a desired length, a wire wound around said core wire, providing a wound wire, and used as an exothermic resistance wire, and a pair of lead wires connected to opposite ends of said wound wire, said core wire being made of a sublimatable material; forming a layer of composite material by coating ceramic and glass particles on said wound wire over the entire surface thereof and thereafter sintering said ceramic and glass particles; coating said layer of composite material with molten glass after the composite material layer has been formed; and removing said core wire by heat treatment so as to sublimate the sublimatable material.

* * * * *